US010309799B2

(12) United States Patent
Ledroz

(10) Patent No.: US 10,309,799 B2
(45) Date of Patent: Jun. 4, 2019

(54) CORRECTION OF ROTATION RATE MEASUREMENTS

(71) Applicant: Gyrodata, Incorporated, Houston, TX (US)

(72) Inventor: Adrián Guillermo Ledroz, Houston, TX (US)

(73) Assignee: Gyrodata, Incorporated, Houston, TX (US)

( * ) Notice: Subject to any disclaimer, the term of this patent is extended or adjusted under 35 U.S.C. 154(b) by 0 days.

(21) Appl. No.: 15/865,083

(22) Filed: Jan. 8, 2018

(65) Prior Publication Data

US 2018/0128643 A1    May 10, 2018

Related U.S. Application Data

(63) Continuation of application No. 15/291,998, filed on Oct. 12, 2016, now Pat. No. 9,863,783.

(51) Int. Cl.
*G01C 25/00* (2006.01)
*E21B 47/022* (2012.01)
(Continued)

(52) U.S. Cl.
CPC ............ *G01C 25/00* (2013.01); *E21B 47/022* (2013.01); *G01V 11/002* (2013.01); *E21B 7/04* (2013.01); *G01C 19/5776* (2013.01)

(58) Field of Classification Search
CPC ............ G01C 25/00; G01C 1/34; G01C 1/22
(Continued)

(56) References Cited

U.S. PATENT DOCUMENTS 4,510,696 A    4/1985  Roesler
4,614,040 A    9/1986  Hulsing, II et al.
(Continued)

FOREIGN PATENT DOCUMENTS

| EP | 2759674 A2 | 7/2014 |
| GB | 2158587 B | 1/1988 |
| WO | 2010035099 A1 | 4/2010 |

OTHER PUBLICATIONS

GB Search Report; GB 2556686A; dated Mar. 14, 2018.

*Primary Examiner* — Jewel V Dowtin
(74) *Attorney, Agent, or Firm* — Pramudji Law Group PLLC; Ari Pramudji

(57) ABSTRACT

Various implementations directed to correction of rotation rate measurements are provided. In one implementation, a method may include receiving rotation rate measurements about a first axis and a second axis from first gyroscopic sensors. The method may include receiving a first rotation rate measurement about a third axis from a second gyroscopic sensor. The method may include determining an estimated rotation rate measurement about the third axis based on the rotation rate measurements about the first axis and the second axis. The method may include determining a bias value based on a difference between the first rotation rate measurement about the third axis and the estimated rotation rate measurement. The method may include receiving second rotation rate measurements about the third axis from the second gyroscopic sensor. The method may include correcting the second rotation rate measurements about the third axis based on the determined bias value.

20 Claims, 5 Drawing Sheets

(51) Int. Cl.
*G01V 11/00* (2006.01)
*E21B 7/04* (2006.01)
*G01C 19/5776* (2012.01)

(58) Field of Classification Search
USPC .......................................... 702/6; 73/861.42
See application file for complete search history.

(56) References Cited

U.S. PATENT DOCUMENTS

| | | |
|---|---|---|
| 5,657,547 A | 8/1997 | Uttecht et al. |
| 5,814,738 A | 9/1998 | Pinkerton et al. |
| 6,347,282 B2 | 2/2002 | Estes et al. |
| 6,508,316 B2 | 1/2003 | Estes et al. |
| 6,529,834 B1 | 3/2003 | Estes et al. |
| 7,500,405 B2 | 3/2009 | Gongaware et al. |
| 7,669,656 B2 | 3/2010 | Wright et al. |
| 7,712,223 B2 | 5/2010 | Imamura et al. |
| 7,832,283 B2 | 11/2010 | Peters et al. |
| 8,180,571 B2 | 5/2012 | Holmes |
| 8,185,312 B2 | 5/2012 | Ekseth et al. |
| 8,374,793 B2 | 2/2013 | Ekseth et al. |
| 8,428,879 B2 | 4/2013 | Ekseth et al. |
| 8,820,178 B2 | 9/2014 | Ayers et al. |
| 9,273,547 B2 | 3/2016 | Brooks et al. |
| 9,863,783 B1 * | 1/2018 | Ledroz .................. E21B 47/022 |
| 2007/0175055 A1 | 8/2007 | Estes et al. |
| 2016/0032709 A1 | 2/2016 | Ledroz et al. |

\* cited by examiner

CORRECTION OF ROTATION RATE MEASUREMENTS

CROSS-REFERENCE TO RELATED APPLICATIONS

This application is a continuation of U.S. patent application Ser. No. 15/291,998, filed 2016 Oct. 12, titled CORRECTION OF ROTATION RATE MEASUREMENTS, and which is incorporated herein by reference in its entirety.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

A survey tool may be used in a gyrocompassing survey of a wellbore, where the survey tool may include one or more gyroscopic sensors configured to provide at least one data signal indicative of the orientation of the survey tool relative to the rotation axis of the Earth. In particular, the one or more gyroscopic sensors may be configured to measure one or more components of the Earth's rotation rate. These measurements may then be used in combination with measurements of tool inclination and tool face angle to compute an azimuth of the survey tool and, hence, an azimuth of the wellbore at the location of the survey tool within the wellbore. However, in some scenarios, the one or more gyroscopic sensors may contain biases that can degrade the accuracy of the gyroscopic sensor measurements, which can lead to inaccurate azimuth computations.

SUMMARY

Described herein are implementations of various technologies relating to correction of rotation rate measurements. In one implementation, a method may include receiving one or more rotation rate measurements about a first axis of a survey tool disposed in a wellbore from one or more first gyroscopic sensors of the survey tool. The method may also include receiving one or more rotation rate measurements about a second axis of the survey tool from the one or more first gyroscopic sensors. The method may further include receiving a first rotation rate measurement about a third axis of the survey tool from a second gyroscopic sensor of the survey tool. The method may additionally include determining an estimated rotation rate measurement about the third axis of the survey tool based on the one or more rotation rate measurements about the first axis of the survey tool and the one or more rotation rate measurements about the second axis of the survey tool. In addition, the method may include determining a bias value based on a difference between the first rotation rate measurement about the third axis of the survey tool and the estimated rotation rate measurement. The method may also include receiving one or more second rotation rate measurements about the third axis of the survey tool from the second gyroscopic sensor of the survey tool. The method may further include correcting the one or more second rotation rate measurements about the third axis of the survey tool based on the determined bias value.

In another implementation, a method may include receiving one or more rotation rate measurements about a first axis of a survey tool disposed in a wellbore from a first gyroscopic sensor of the survey tool. The method may also include receiving one or more rotation rate measurements about a second axis of the survey tool from a second gyroscopic sensor of the survey tool. The method may further include receiving a first rotation rate measurement about a third axis of the survey tool from a third gyroscopic sensor of the survey tool. The method may additionally include determining an estimated rotation rate measurement about the third axis of the survey tool based on the one or more rotation rate measurements about the first axis of the survey tool and the one or more rotation rate measurements about the second axis of the survey tool. The method may further include determining a bias value based on a difference between the first rotation rate measurement about the third axis of the survey tool and the estimated rotation rate measurement. The method may also include receiving one or more second rotation rate measurements about the third axis of the survey tool from the third gyroscopic sensor of the survey tool. The method may additionally include correcting the one or more second rotation rate measurements about the third axis of the survey tool based on the determined bias value.

In yet another implementation, a system may include a survey tool disposed in a wellbore. The survey tool may include one or more first gyroscopic sensors configured to provide one or more rotation rate measurements about a first axis of the survey tool, and to provide one or more rotation rate measurements about a second axis of the survey tool. The survey tool may also include a second gyroscopic sensor configured to provide a first rotation rate measurement about a third axis of the survey tool, and to provide one or more second rotation rate measurements about the third axis of the survey tool. The system may also include a computing system having a processor and a memory. The memory may include a plurality of program instructions which, when executed by the processor, cause the processor to determine an estimated rotation rate measurement about the third axis of the survey tool based on the one or more rotation rate measurements about the first axis of the survey tool and the one or more rotation rate measurements about the second axis of the survey tool. The memory may also include a plurality of program instructions which, when executed by the processor, cause the processor to determine a bias value based on a difference between the first rotation rate measurement about the third axis of the survey tool and the estimated rotation rate measurement. The memory may further include a plurality of program instructions which, when executed by the processor, cause the processor to correct the one or more second rotation rate measurements about the third axis of the survey tool based on the determined bias value.

In yet another implementation, a method may include receiving one or more rotation rate measurements about a first axis of a survey tool disposed in a wellbore from one or more first gyroscopic sensors of the survey tool. The method may also include receiving one or more rotation rate measurements about a second axis of the survey tool from the one or more first gyroscopic sensors. The method may further include receiving a first rotation rate measurement about a third axis of the survey tool from a second gyroscopic sensor of the survey tool. The method may additionally include receiving one or more measurements of the Earth's gravitation vector from one or more accelerometers of the survey tool. The method may also include receiving a value representing true latitude of the survey tool. The method may further include determining a measured latitude of the survey tool based on the one or more measurements of the Earth's gravitation vector, the one or more rotation rate measurements about the first axis of the survey tool, the one or more rotation rate measurements about the second axis of the survey tool, and the first rotation rate measurement about the third axis of the survey tool. The method may additionally include determining a first bias value based on the true latitude and the measured latitude of the survey tool. The method may also include receiving one or more second rotation rate measurements about the third axis of the survey tool from the second gyroscopic sensor of the survey tool. The method may further include correcting the one or more second rotation rate measurements about the third axis of the survey tool based on the first bias value.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
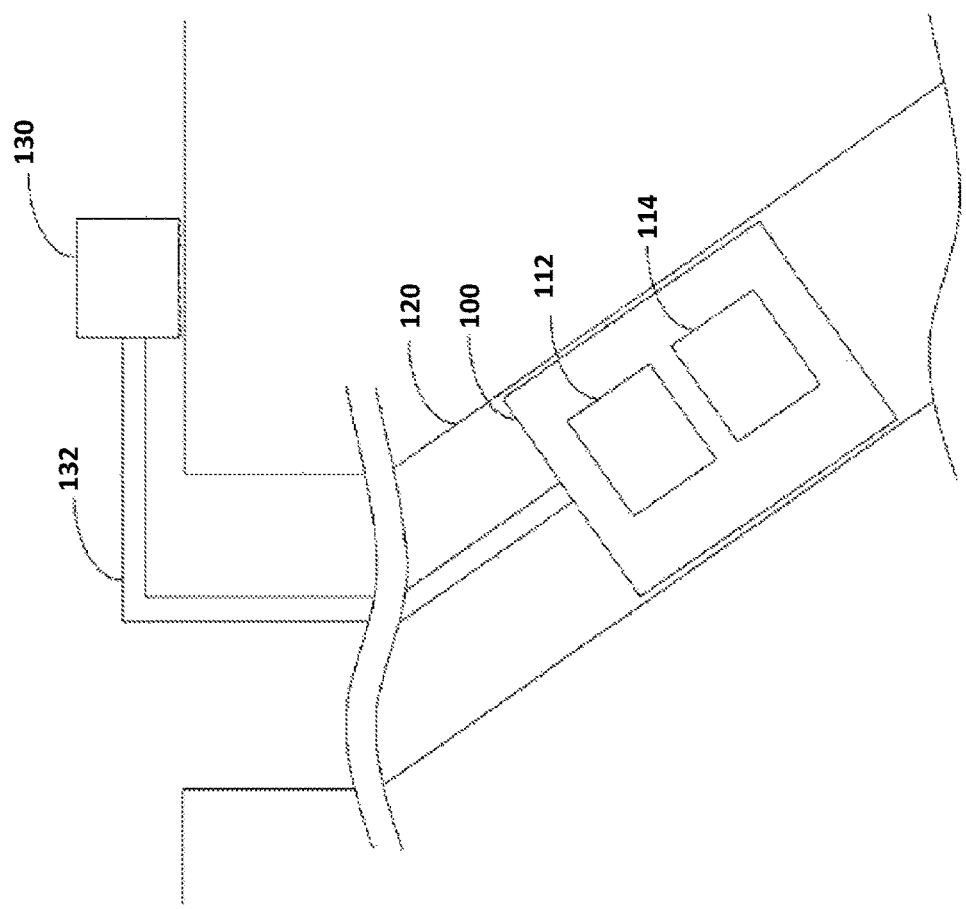
FIG. 1 illustrates a schematic diagram of a gyrocompassing survey operation in accordance with implementations of various techniques described herein.

Various implementations directed to correction of rotation rate measurements will now be described in the following paragraphs with reference to FIGS. 1-5.

To obtain hydrocarbons such as oil and gas, directional wellbores may be drilled through Earth formations along a selected trajectory. The selected trajectory may deviate from a vertical direction relative to the Earth at one or more inclination angles and at one or more azimuth directions with respect to a true north along the length of the wellbore. As such, measurements of the inclination and azimuth of the wellbore may be obtained during drilling to determine whether the selected trajectory is being maintained.

As is known in the art, a directional survey may be performed to measure the inclination and azimuth at selected positions along the wellbore. In particular, a survey tool may be used within the wellbore to determine the inclination and azimuth along the wellbore. The survey tool may include sensors configured to generate measurements corresponding to the instrument orientation with respect to one or more reference directions and/or to the Earth's gravity, where the measurements may be used to determine azimuth and inclination along the wellbore. For example, the survey tool may include one or more accelerometers configured to measure one or more orthogonal components of the Earth's gravity, where the measurements may be used to generate an inclination angle and a toolface angle of the survey tool.

In addition, the survey tool may include one or more gyroscopic sensors configured to measure one or more components of the Earth's rotation rate about one or more orthogonal axes of the survey tool. These measurements from the gyroscopic sensors may then be used in combination with measurements of tool inclination and tool face angle to compute an azimuth of the survey tool, and, hence, an azimuth of the wellbore at the location of the survey tool within the wellbore. As such, it may be said that the survey tool can be used to perform a gyrocompassing survey, where gyroscopic measurements are taken in order to measure rotations due to the Earth's rotation.

When conducting a gyrocompassing survey of a wellbore, it is desirable for the survey tool to be substantially stationary with respect to the Earth while the data is collected, which would ensure that the one or more gyroscopic sensors of the survey tool are subject only to the rotational motion of the Earth while the measurements are being made. Further, the survey tool can be used to perform a gyrocompassing survey and/or other collection of measurements in conjunction with various applications, such as gyro-while-drilling (GWD) applications, wireline surveys, slickline surveys (e.g., surveys run on a wireline without communication to the surface), drop surveys, and/or any other applications known to those skilled in the art.

As noted above, a directional wellbore may be drilled along a selected trajectory that may deviate from a vertical direction relative to the Earth at one or more inclination angles and at one or more azimuth directions with respect to true north along the length of the wellbore. A survey tool that includes a single dual-axis gyroscopic sensor or two single-axis gyroscopic sensors can be used to provide accurate measurements of the Earth's rotation rate in wellbores that are near vertical or with moderate inclination. In one implementation, a wellbore having an inclination angle of less than sixty degrees may be characterized as near vertical or with moderate inclination.

In some implementations, for near vertical or moderate inclination wellbores, a dual-axis gyroscopic sensor may be used to provide measurements of the Earth's rotation rate about two axes (i.e., x-axis and y-axis) of the survey tool, where the two axes are substantially perpendicular to a longitudinal axis (i.e., z-axis) of the survey tool and are substantially perpendicular to one another. Thus, such a dual-axis gyroscopic sensor may be configured to provide both measurements of a component of the Earth's rotation rate with respect to the x-axis of the survey tool and measurements of a component of the Earth's rotation rate with respect to the y-axis of the survey tool.

In other implementations, for near vertical or moderate inclination wellbores, single-axis gyroscopic sensors may be used to provide measurements of the Earth's rotation rate about the x-axis and y-axis of the survey tool. In particular, one single-axis gyroscopic sensor may be used to provide measurements of the Earth's rotation rate about the x-axis, and another single-axis gyroscopic sensor may be used to provide measurements of the Earth's rotation rate about the y-axis.

Thus, for a wellbore that is near vertical or with moderate inclination, a survey tool that includes the dual-axis gyroscopic sensor and/or one or more of the single-axis gyroscopic sensors may be able to provide accurate measurements of components of the Earth's rotation rate about the x-axis and y-axis of the survey tool. The dual-axis gyroscopic sensor and/or the one or more single-axis gyroscopic sensors of a survey tool used to provide measurements of the Earth's rotation rate about the x-axis and y-axis may be hereinafter referred to as either a two-axis gyroscopic system or as a xy-gyroscopic system.

Deviated and/or substantially horizontal wellbores may also be drilled to extract hydrocarbons from the Earth's formations. As is known in the art, a wellbore may be characterized as deviated and/or substantially horizontal if an inclination angle of the wellbore is greater than a particular value. For example, a wellbore having an inclination angle of greater than sixty degrees may be characterized as deviated and/or substantially horizontal.

However, as is known to those skilled in the art, the Earth's rotation rate about the z-axis of the survey tool may have a considerable effect on the azimuth of a survey tool in deviated and/or substantially horizontal wellbores. As such, measurements obtained using only a xy-gyroscopic system may lead to inaccurate determinations of azimuth for deviated and/or substantially horizontal wellbores. In one example, the azimuth of a survey tool, and hence the measured azimuth of a wellbore, may become less accurate if an inclination angle of the wellbore exceeds sixty degrees.

To address these issues relating to deviated and/or substantially horizontal wellbores, a survey tool may include an additional gyroscopic sensor to provide measurements of the Earth's rotation rate about the z-axis of the survey tool. This additional gyroscopic sensor may be hereinafter referred to as a z-axis gyroscopic sensor. The z-axis gyroscopic sensor may be a single-axis gyroscopic sensor or a dual-axis gyroscopic sensor, as is known to those skilled in the art. In some implementations, a survey tool may include a xy-gyroscopic system and a z-axis gyroscopic sensor. In such implementations, the survey tool may be configured to provide measurements of a component of the Earth's rotation rate with respect to the x-axis of the survey tool, measurements of a component of the Earth's rotation rate with respect to the y-axis of the survey tool, and measurements of a component of the Earth's rotation with respect to the z-axis of the survey tool. The combination of the xy-gyroscopic system and the z-axis gyroscopic sensor in a survey tool may be hereinafter referred to as a xyz-gyroscopic system.

The measurements provided by a gyroscopic sensor of a survey tool may contain fixed, systematic errors or biases that may severely impact the accuracy of the sensor's measurements and, thus, the azimuth. In particular, the measurements provided by a gyroscopic sensor may be in error owing to a variety of causes, such as measurement biases, mounting misalignments of the gyroscopic sensor, scale factor errors, and/or other imperfections known to those skilled in the art. These causes may give rise to errors in the measurements provided by the gyroscopic sensor.

In some scenarios, measurement biases may be the dominant cause of errors in the measurements provided by a gyroscopic sensor. As such, in one implementation, to compensate for the bias values in the measurements from a gyroscopic sensor, an indexing procedure may be performed on the sensor. As is known to those skilled in the art, a gyroscopic sensor may be indexed by adjusting the sensor to two or more positions and using measurements from the two or more positions to determine the bias values.

In one such implementation, indexing of sensor of a xy-gyroscopic system may performed by using the sensor to measure the Earth's rotational rate at two different index positions that are 180 degrees apart from one another. In particular, the sensor of the xy-gyroscopic system may be rotated about the z-axis of the survey tool to turn the sensor between the two index positions. In some implementations, the sensor may be mounted on a rotatable platform that can be turned to various index positions.

For example, a single-axis gyroscopic sensor may provide measurements of the Earth's rotation rate about the x-axis of the survey tool, and may be configured to rotate about the z-axis of the survey tool between a first index position and a second index position. The first index position and the second index position may be 180 degrees apart, and the sensor may provide a measurement at each index position. Because the index positions are 180 degrees apart, one measurement may be a positive value while the other measurement may be a negative value, whereas any bias values may maintain the same sign. As such, by summing the two measurements and dividing by two, an estimate of the bias value may be obtained. This bias value may then be used to correct subsequent measurements from the sensor prior to determining the azimuth of the survey tool. In addition, by calculating the difference between the two measurements and dividing by two, a more accurate measurement of the Earth's rotation rate about the x-axis can be obtained with the effect of any bias largely removed. This more accurate measurement may hereinafter be referred to as an indexed measurement.

As is known to those skilled in the art, a similar indexing procedure may be performed on a single-axis gyroscopic sensor that provides measurements of the Earth's rotation rate about the x or y-axis of the survey tool alone. Further, as is also known to those skilled in the art, a similar indexing procedure may be performed on a dual-axis gyroscopic sensor configured to provide measurements of the Earth's rotation rate with respect to the x-axis and the y-axis of the survey tool, where measurements may be taken with respect to the x-axis and the y-axis at each index position. As such, the indexing procedure may be used to determine a bias value for each of x-axis and y-axis, and may be used to determine an indexed measurement of the Earth's rotation rate about each of the x-axis and the y-axis. In addition, indexing of a sensor of a xy-gyroscopic system may be performed by using the sensor to measure the Earth's rotational rate at more than two different index positions, such as four index positions separated by 90 degrees (i.e., the difference between the first index position and the second index position can be 90 degrees, the difference between the second index position and the third index position may be 90 degrees, and the difference between the third index position and the fourth index position may be 90 degrees). Other orientations and number of index positions may be used, as well. Further implementations of indexing procedures are further described in commonly-assigned U.S. Pat. No. 8,374,793, the entire disclosure of which is herein incorporated by reference.

Performing the indexing procedure on the z-axis gyroscopic sensor of a survey tool may be difficult as a result of spatial limitations. Size and volumetric restrictions of the survey tool may prohibit rotation of the z-axis gyroscopic sensor in the same manner as the gyroscopic sensors discussed above. Without performing the indexing procedure on the z-axis gyroscopic sensor, fixed bias values may severely impact the accuracy of the sensor's measurements and, thus, the azimuth, particularly for deviated and/or substantially horizontal wellbores.

In view of the above, various implementations described herein may be used to compensate for fixed biases in the measurements provided by the z-axis gyroscopic sensor.
System FIG. 1 illustrates a schematic diagram of a gyrocompassing survey operation in accordance with implementations of various techniques described herein. As shown, the gyrocompassing survey operation may be performed using a survey tool 100 and a computing system 130.

The survey tool 100 may be similar to the survey tool discussed above. The survey tool 100 may be disposed within a wellbore 120, and may be used in conjunction with various applications, as discussed above. For example, the survey tool may include an instrumentation pack which is part of a downhole portion of a drill string within the wellbore 120. The survey tool 100 may include one or more first gyroscopic sensors 112 and a second gyroscopic sensor 114.

In one implementation, the one or more first gyroscopic sensors 112 may be part of the xy-gyroscopic system discussed above. In particular, the one or more first gyroscopic sensors 112 may include a dual-axis gyroscopic sensor, one or more single-axis gyroscopic sensors, or combinations thereof that are configured to provide measurements of the Earth's rotation rate about the x-axis and the y-axis of the survey tool 100. Further, the second gyroscopic sensor 114 may be the z-axis gyroscopic sensor discussed above. In particular, the second gyroscopic sensor 114 may be a single-axis gyroscopic sensor or a dual-axis gyroscopic sensor configured to provide measurements of the Earth's rotation rate about the z-axis of the survey tool 100. In another implementation, the z-axis of the survey tool 100 may be parallel to the longitudinal axis of the wellbore 120.

The sensors of the one or more first gyroscopic sensors 112 and the second gyroscopic sensor 114 may include: a spinning mass gyroscopic sensor, such as a single-axis rate integrating gyroscopic sensor or a dual-axis dynamically tuned gyroscopic sensor; an optical gyroscopic sensor, such as a ring laser gyroscopic sensor (RLG) or a fiber-optic gyroscopic sensor (FOG); a Coriolis vibratory gyroscopic sensor, such as a tuning fork gyroscopic sensor or a hemispherical resonator gyroscopic sensor (HRG); a microelectromechanical system (MEMS) gyroscopic sensor; and/or any other implementation known to those skilled in the art. The one or more first gyroscopic sensors 112 and the second gyroscopic sensor 114 may be capable of providing measurements of the Earth's rotation rate to the desired accuracy (e.g., in a range from 0.01°/hour to 0.05°/hour). The one or more gyroscopic sensors may be sufficiently small to be accommodated in a downhole tool (e.g., within the confines of a 1¾-inch pressure case of a wellbore), capable of operating over an expected temperature range (e.g., −20° Celsius (C) to +150° C., or greater), and/or capable of surviving the down hole vibration and shock environment that may be encountered during the drilling process.

In a further implementation, the survey tool 100 may include three single-axis gyroscopic sensors or two dual-axis gyroscopic sensors, which may provide three axes of measurements of the Earth's rotation rate. In one such implementation, the one or more first gyroscopic sensors 112 may include a single-axis gyroscopic sensor to provide measurements of the Earth's rotation rate about the x-axis and another single-axis gyroscopic sensor to provide measurements of the Earth's rotation rate about the y-axis, and the second gyroscopic sensor 114 may include a single-axis gyroscopic sensor to provide measurements of the Earth's rotation rate about the z-axis.

In another implementation, the one or more first gyroscopic sensors 112 and the second gyroscopic sensor 114 may both be portions of a single gyroscopic sensor having input axes along the x-, y-, and z-axes. In yet another implementation, the survey tool 100 may include redundant gyroscopic sensors, and at least one of the first gyroscopic sensor 112 and the second gyroscopic sensor 114 may include a plurality of gyroscopic sensors with the same input axes. In another implementation, the measurements about the x-, y-, and z-axes from these gyroscopic sensors and/or repeated measurements are advantageously averaged together to provide more reliable measurements, possible quality control checks, and/or a built-in test facility.

While not shown in FIG. 1, the survey tool 100 may also include one or more acceleration sensors (e.g., single-axis or multiple-axis accelerometers), one or more magnetic sensors (e.g., single-axis or multiple axis magnetometers), one or more temperature sensors, and/or one or more gamma ray sensors to provide further information regarding the position or orientation of the survey tool 100.

The one or more acceleration sensors can be disposed within the survey tool 100, or may, alternatively, be disposed separately from the survey tool 100. In one implementation, the one or more acceleration sensors may include three single-axis accelerometers configured to provide measurements of the orthogonal components ($g_x$, $g_y$, $g_z$) of the Earth's gravitation vector with respect to the x, y, and z axes of the survey tool. Various types of accelerometers may be used, such as quartz flexure accelerometers, MEMS accelerometer devices, and/or any other type of accelerometers known to those skilled in the art. In one implementation, the measurement range of the accelerometers may be in excess of ±1 unit of standard gravity (g) (e.g., in a range between ±1.2 g and ±1.5 g). Further, the accelerometers may be of a size that can be accommodated in a downhole tool (e.g., within the confines of a 1 and ¾ inch pressure case of a wellbore), capable of operating over an expected temperature range (e.g., −20° C. to +150° C., or greater), and capable of surviving the downhole vibration and shock environment that may be encountered during the drilling process.

Figure 2:
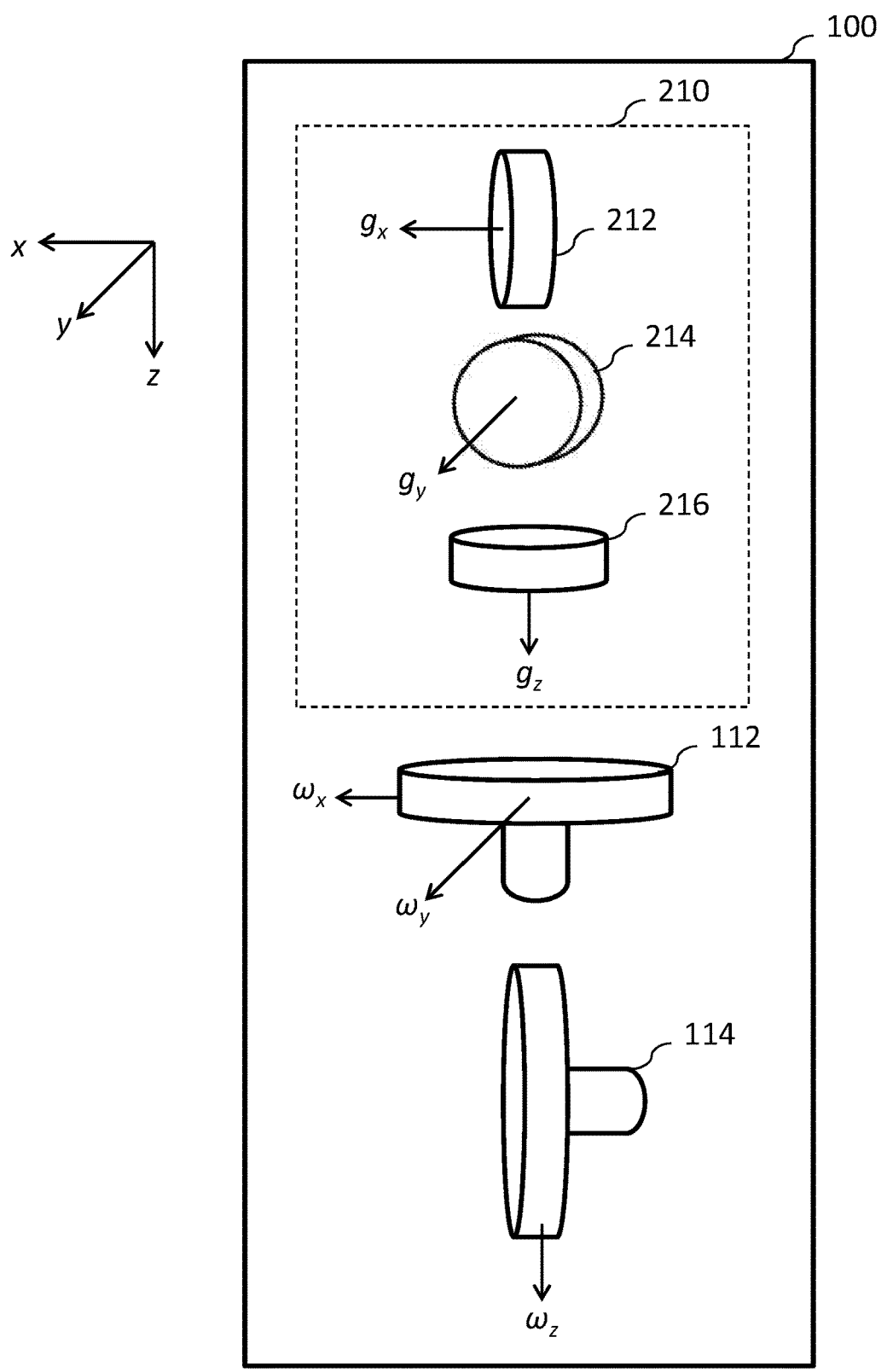
FIG. 2 illustrates a schematic diagram of the survey tool in accordance with implementations of various techniques described herein.

For example, FIG. 2 illustrates a schematic diagram of the survey tool 100 in accordance with implementations of various techniques described herein. As shown, survey tool 100 includes the one or more first gyroscopic sensors 112 and the second gyroscopic sensor 114. In particular, the one or more first gyroscopic sensors 112 includes a dual-axis gyroscopic sensor configured to provide measurements of a component ($\omega_x$) of the Earth's rotation rate about the x-axis of the survey tool 100, and measurements of a component ($\omega_y$) of the Earth's rotation rate about the y-axis of the survey tool 100. Further, the second gyroscopic sensor 114 includes a dual-axis gyroscopic sensor configured to provide measurements of a component ($\omega_z$) of the Earth's rotation rate about the z-axis of the survey tool 100.

In addition, the z-axis of the survey tool 100 may be parallel to the longitudinal axis of the wellbore 120, and, as shown, the x-axis, y-axis, and z-axis of the survey tool 100 are orthogonal to one another. Further, the indexing procedure may be applied to the dual-axis gyroscopic sensor 112, as described above, where the dual-axis gyroscopic sensor 112 may be rotated about the z-axis of the survey tool 100 to turn the sensor 112 between two index positions. As is known in the art, other implementations for the gyroscopic sensors of the survey tool 100 may be used instead of the implementation shown in FIG. 2.

As is also shown, the survey tool 100 may include an accelerometer module 210, where the accelerometer module 210 may include three single-axis accelerometers 212, 214, and 216. In particular, the single-axis accelerometer 212 may be configured to provide measurements of a component ($g_x$) of the Earth's gravitation vector with respect to the x-axis of the survey tool 100. Further, the single-axis accelerometer 214 may be configured to provide measurements of a component ($g_y$) of the Earth's gravitation vector with respect to the y-axis of the survey tool 100. In addition, the single-axis accelerometer 216 may be configured to provide measurements of a component ($g_z$) of the Earth's gravitation vector with respect to the z-axis of the survey tool 100. As is known in the art, other implementations for the accelerometers of the survey tool 100 may be used instead of the implementation shown in FIG. 2.

Returning to FIG. 1, in some implementations, the computing system 130 may be coupled to the survey tool 100 so as to provide control signals to the survey tool 100 to control an orientation of the one or more first gyroscopic sensors 112 relative to the z-axis of the survey tool 100, and to control an orientation of the second gyroscopic sensor 114 relative to the z-axis of the survey tool 100. In addition, the computing system 130 may be configured to receive measurements of the Earth's rotation rate from the one or more first gyroscopic sensors 112 and the second gyroscopic sensor 114, and to calculate information regarding one or more bias values in the measurements. In a further implementation, the computing system 130 may be disposed at the surface and may be communicatively coupled to the survey tool 100 by an elongate portion 132 (e.g., a wire or cable) such that the measurements may be transmitted between the survey tool 100 and the computing system 130 located at the surface. Further, at least a portion of the computing system 130 may be located in the survey tool 100 within the wellbore 120.

In another implementation, the computing system 130 may include a microprocessor adapted to perform the method described herein for compensating for bias values in gyroscopic measurements made using the survey tool 100. In addition, the computing system 130 may be further adapted to determine the inclination and highside/toolface angle or the trajectory of the survey tool 100 within the wellbore 120. The computing system 130 further may include a memory subsystem adapted to store at least a portion of the data obtained from the sensors of the survey tool 100. The computing system 130 can comprise hardware, software, or a combination of both hardware and software. In addition, the computing system 130 may include a standard personal computer. The computing system 130 may include appropriate interfaces (e.g., modems) to transmit control signals to the survey tool 100 and to receive measurement signals from the survey tool 100. The computing system 130 can include standard communication components (e.g., keyboard, mouse, toggle switches) for receiving user input, and can comprise standard communication components (e.g., image display screen, alphanumeric meters, printers) for displaying and/or recording operation parameters, survey system orientation and/or location coordinates, or other information provided by or derived from information from the survey tool 100. The computing system 130 may be configured to read a computer-readable medium (e.g., read-only memory, dynamic random-access memory, flash memory, hard disk drive, compact disk, digital video disk) which has instructions stored thereon which cause the computing system 130 to perform a method for compensating for bias values in accordance with certain embodiments described herein.

In another implementation, the computing system 130 may be adapted to perform a post-processing analysis of the data obtained from the various sensors of the survey tool 100. In such post-processing implementations, data may be obtained and saved from the various sensors as the survey tool 100 travels within the wellbore 120, and the saved data may be later analyzed to determine information regarding the wellbore 120. The saved data obtained from the various sensors may include time reference information (e.g., time tagging). In other implementations, the computing system 130 may provide a real-time processing analysis of the signals or data obtained from the various sensors of the survey tool 100. In such real-time processing implementations, data obtained from the various sensors may be analyzed while the survey tool 100 travels within the wellbore 120. In some implementations, at least a portion of the data obtained from the various sensors may be saved in memory for analysis by the computing system 130, and the computing system 130 comprises sufficient data processing and data storage capacity to perform the real-time analysis. Various implementations of the computing system 130 are discussed further below.

Method

Using the system discussed above, one or more methods may be used to compensate for fixed biases in rotation rate measurements provided by a z-axis gyroscopic sensor of a survey tool. In one implementation, rotation rate measurements from a z-axis gyroscopic sensor of a survey tool may be corrected based on rotation rate measurements from other gyroscopic sensors of the survey tool. In another implementation, rotation rate measurements from a z-axis gyroscopic sensor of a survey tool may be corrected based on latitude (A).

Correction Based on Rotation Rate Measurements

Figure 3:
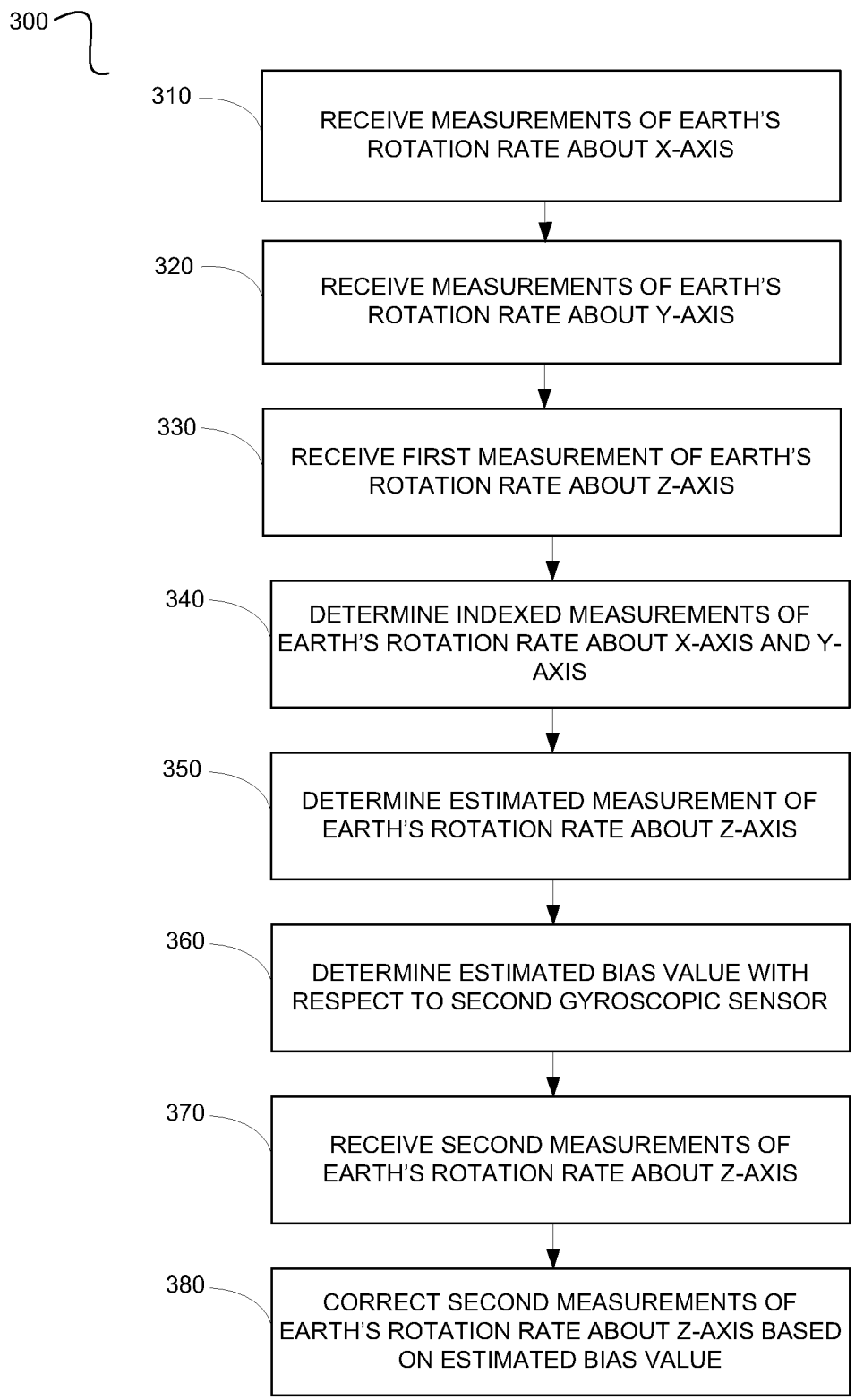
FIG. 3 illustrates a flow diagram of a method for correction of rotation rate measurements in accordance with implementations of various techniques described herein.

FIG. 3 illustrates a flow diagram of a method 300 for correction of rotation rate measurements in accordance with implementations of various techniques described herein. In one implementation, method 300 may be at least partially performed by a computing system, such as the computing system 130 discussed above. It should be understood that while method 300 indicates a particular order of execution of operations, in some implementations, certain portions of the operations might be executed in a different order. Further, in some implementations, additional operations or steps may be added to the method 300. Likewise, some operations or steps may be omitted.

At block 310, the computing system may receive one or more measurements of the Earth's rotation rate about the x-axis of a survey tool from one or more first gyroscopic sensors of the tool. As noted above, the one or more first gyroscopic sensors may include a dual-axis gyroscopic sensor, one or more single-axis gyroscopic sensors, or combinations thereof.

In one implementation, the computing system may receive at least two measurements of the Earth's rotation rate about the x-axis that were taken at two or more index positions. As noted above, in one example, the index positions may include a first index position and a second index position that are 180 degrees apart, where a first gyroscopic sensor rotates about the z-axis of the survey tool to turn the first gyroscopic sensor between the two index positions. In another example, the index positions may include a first index position, a second index position, a third index position, and a fourth index position that are 90 degrees apart, where a first gyroscopic sensor rotates about the z-axis of the survey tool to turn the first gyroscopic sensor between the four index positions. As also noted above, a different number of index positions may be used, as well.

At block 320, the computing system may receive one or more measurements of the Earth's rotation rate about the y-axis of a survey tool from the one or more first gyroscopic sensors. As noted above, the x-axis and the y-axis may be substantially perpendicular to a longitudinal axis (i.e., z-axis) of the survey tool and may be substantially perpendicular to one another. In one implementation, one dual-axis gyroscopic sensor may be used to provide measurements of the Earth's rotation rate about both the x-axis and the y-axis of the survey tool.

In another implementation, the computing system may receive at least two measurements of the Earth's rotation rate about the y-axis that were taken at two or more index positions. As noted above, in one example, the index positions may include a first index position and a second index position that are 180 degrees apart, where a first gyroscopic sensor rotates about the z-axis of the survey tool to turn the first gyroscopic sensor between the two index positions. In another example, the index positions may include a first index position, a second index position, a third index position, and a fourth index position that are 90 degrees apart, where a first gyroscopic sensor rotates about the z-axis of the survey tool to turn the first gyroscopic sensor between the four index positions. As also noted above, a different number of index positions may be used, as well.

At block 330, the computing system may receive a first measurement of the Earth's rotation rate about the z-axis of the survey tool from a second gyroscopic sensor. As noted above, the second gyroscopic sensor may be the z-axis gyroscopic sensor discussed above. In particular, the second gyroscopic sensor may be a single-axis gyroscopic sensor or a dual-axis gyroscopic sensor configured to provide measurements of the Earth's rotation rate about the z-axis of the survey tool.

At block 340, the computing system may determine an indexed measurement of the Earth's rotation rate about the x-axis of the survey tool, and may determine an indexed measurement of the Earth's rotation rate about the y-axis of the survey tool. In some implementations, block 340 may be optional.

As noted above, an indexed measurement may be determined by calculating a difference between measurements of the Earth's rotation rate taken from two index positions and dividing by two. The indexed measurement may be a more accurate measurement of the Earth's rotation rate, as it may eliminate bias value. For example, using a dual-axis gyroscopic sensor to provide measurements of the Earth's rotation rate about both the x-axis and the y-axis of the survey tool at a first index position and a second index position, the measurements of the Earth's rotation rate about the x-axis ($\omega_{x0}$) and the y-axis ($\omega_{y0}$) that were taken at the first index position may be:

$$\omega_{x0} = \omega_x + B_x; \quad (1)$$

$$\omega_{y0} = \omega_y + B_y, \quad (2)$$

where $\omega_x$ represents the indexed measurement of the Earth's rotation rate about the x-axis of the survey tool, $\omega_y$ represents the indexed measurement of the Earth's rotation rate about the y-axis of the survey tool, $B_x$ represents a bias value in the measurements of the Earth's rotation rate about the x-axis, and $B_y$ represents a bias value in the measurements of the Earth's rotation rate about the y-axis.

Further, using the dual-axis gyroscopic sensor to provide measurements of the Earth's rotation rate about both the x-axis and the y-axis of the survey tool, the measurements of the Earth's rotation rate about the x-axis ($\omega_{x1}$) and the y-axis ($\omega_{y1}$) that were taken at a second index position disposed 180 degrees from the first position may be:

$$\omega_{x1} = -\omega_x + B_x; \quad (3)$$

$$\omega_{y1} = -\omega_y + B_y. \quad (4)$$

The bias values may be obtained by summing the respective measurements and dividing by two:

$$B_x = (\omega_{x0} + \omega_{x1})/2; \quad (5)$$

$$B_y = (\omega_{y0} + \omega_{y1})/2. \quad (6)$$

The indexed measurements may be determined by calculating the difference between the respective measurements and dividing by two:

$$\omega_x = (\omega_{x0} - \omega_{x1})/2; \quad (7)$$

$$\omega_y = (\omega_{y0} - \omega_{y1})/2. \quad (8)$$

A similar procedure may be performed to determine the indexed measurements for implementations using more than two index positions.

In addition, for implementations using two single-axis gyroscopic sensors to provide measurements of the Earth's rotation rate about the x-axis and the y-axis of the survey tool, a similar procedure may be performed to determine the indexed measurements. In particular, a single-axis gyroscopic sensor may be used to provide measurements of the Earth's rotation rate about the x-axis of the survey tool at a first index position and a second index position of the single-axis gyroscopic sensor, where the second index position is disposed 180 degrees from the first position. The bias values may be obtained by summing the respective measurements from the first index position and the second index position of the single-axis gyroscopic sensor, and dividing by two. In addition, the indexed measurement ($\omega_x$) of the Earth's rotation rate about the x-axis of the survey tool may be determined by calculating the difference between the respective measurements from the first index position and the second index position of the single-axis gyroscopic sensor, and dividing by two.

Similarly, another single-axis gyroscopic sensor may be used to provide measurements of the Earth's rotation rate about the y-axis of the survey tool at a first index position and a second index position of this single-axis gyroscopic sensor, where the second index position is disposed 180 degrees from the first position. The bias values may be obtained by summing the respective measurements from the first index position and the second index position of the single-axis gyroscopic sensor, and dividing by two. In addition, the indexed measurement ($\omega_y$) of the Earth's rotation rate about the y-axis of the survey tool may be determined by calculating the difference between the respective measurements from the first index position and the second index position of the single-axis gyroscopic sensor, and dividing by two.

At block 350, the computing system may determine an estimated measurement of the Earth's rotation rate about the z-axis of the survey tool based on the one or more measurements of the Earth's rotation rate about the x-axis and the one or more measurements of the Earth's rotation rate about the y-axis. In a further implementation, the estimated measurement ($\omega_{z\text{-}est}$) of the Earth's rotation rate about the z-axis may be determined using the indexed measurement ($\omega_x$) of the Earth's rotation rate about the x-axis of the survey tool and the indexed measurement ($\omega_y$) of the Earth's rotation rate about the y-axis. In particular, the estimated measurement ($\omega_{z\text{-}est}$) may be determined by:

$$\omega_{z\text{-}est} = \sqrt{\Omega^2 - \omega_x^2 - \omega_y^2}, \quad (9)$$

where $\Omega$ represents the Earth's rotation rate.

As noted above, block 340 may be optional. In such an implementation, the estimated measurement of the Earth's rotation about the z-axis may be determined using a measurement of the Earth's rotation rate about the x-axis from block 310 and a measurement of the Earth's rotation rate about the y-axis from block 320.

At block 360, the computing system may determine an estimated bias value with respect to the second gyroscopic sensor (i.e., the z-axis gyroscopic sensor). In particular, the estimated bias value ($B_z$) may be determined based on the estimated measurement of the Earth's rotation rate about the z-axis of the survey tool and the first measurement ($\tilde{\omega}_{z1}$) of the Earth's rotation rate about the z-axis of the survey tool from block 330. In particular, the estimated bias value may be determined by:

$$B_z = \tilde{\omega}_{z1} - \omega_{z\text{-}est} \quad (10)$$

At block 370, the computing system may receive one or more second measurements ($\tilde{\omega}_{z2}$) of the Earth's rotation rate about the z-axis of the survey tool from the second gyroscopic sensor.

At block 380, the computing system may correct the one or more second measurements of the Earth's rotation rate about the z-axis based on the estimated bias value ($B_z$). In particular, the estimated bias value may be subtracted from the one or more second measurements of the Earth's rotation rate about the z-axis to produce one or more corrected measurements ($\omega_{z\text{-}corr}$) of the Earth's rotation rate about the z-axis of the survey tool:

$$\omega_{z\text{-}corr} = \tilde{\omega}_{z2} - B_z. \quad (11)$$

In a further implementation, the one or more second measurements of the Earth's rotation rate about the z-axis may represent subsequent measurements provided by the second gyroscopic sensor after determining the estimated bias value. The estimated bias value may be stored in memory by the computing system for later use, such that subsequent measurements provided by the second gyroscopic sensor may be corrected.

Correction Based on Latitude

In another implementation, correction of rotation rate measurements may be performed based on latitude ($\lambda$). In particular, the correction may be based on a difference between a true latitude and a measured latitude of the survey tool. True latitude of the survey tool, as is known in the art, may be determined using a device that utilizes a global navigation satellite system, such as global positioning system (GPS), or using any other implementation known to those skilled in the art.

In contrast, the measured latitude may be determined using measurements from the gyroscopic sensors and the accelerometers of the survey tool. In particular, as is known the art, the following vector dot product equations indicate:

$$\sin\lambda = -\omega \cdot g; \quad (12)$$

$$\sin\lambda = -\frac{(\omega_x g_x d + \omega_y g_y + \omega_z g_z)}{|\omega||g|}; \quad (13)$$

where, for these equations, $\lambda$ represents the measured latitude of the survey tool, $\omega_x$ represents a measurement of the Earth's rotation rate about the x-axis of the survey tool, $\omega_y$ represents a measurement of the Earth's rotation rate about the y-axis of the survey tool, $\omega_z$ represents a measurement of the Earth's rotation rate about the z-axis of the survey tool, $g_x$ represents a measurement of the Earth's gravitation vector with respect to the x-axis of the survey tool, $g_y$ represents a measurement of the Earth's gravitation vector with respect to the y-axis of the survey tool, and $g_z$ represents a measurement of the Earth's gravitation vector with respect to the z-axis of the survey tool. In addition, for these equations, $|\omega| = (\omega_x^2 + \omega_y^2 + \omega_z^2)$ and $|g| = (g_x^2 + g_y^2 + g_z^2)$. Using equations 12 and 13, as is known in the art, the measured latitude of the survey tool can be determined using measurements from gyroscopic sensors and accelerometers of the survey tool. In addition, $\omega_x$ and $\omega_y$ may represent indexed measurements of the Earth's rotation rate, as similarly discussed above with respect to FIG. 3.

In one implementation, using equations 12 and 13 and a true latitude of the survey tool, as is known in the art, an estimated measurement of the Earth's rotation rate about the z-axis of the survey tool may be determined. As noted above, $\omega_x$ and $\omega_y$ may represent indexed measurements of the Earth's rotation rate, as similarly discussed above with respect to FIG. 3. The estimated measurement of the Earth's rotation rate about the z-axis of the survey tool may then be used in blocks 360-380 of FIG. 3 to correct one or more measurements of the Earth's rotation rate about the z-axis.

In another implementation, differentiating equation 13 with respect to $\omega_z$ yields the following equations:

$$\Delta\lambda = \frac{1}{|\omega||g|\cos\lambda}\left[-g_z + \frac{(\omega_x g_x + \omega_y g_y + \omega_z g_z)\omega_z}{|\omega|^2}\right]\Delta\omega_z; \quad (14)$$

where $\Delta\lambda$ may represent a latitude error and $\Delta\omega_z$ may represent an estimated bias value with respect to a z-axis gyroscopic sensor of the survey tool. In addition, the latitude error may be determined by finding a difference between a true latitude and a measured latitude of the survey tool.

Equation 14 may be rewritten to solve for the estimated bias value with respect to a z-axis gyroscopic sensor of the survey tool ($\Delta\omega_z$):

$$\Delta\omega_z = \frac{|\omega||g|\cos\lambda}{\left[-g_z + \frac{(\omega_x g_x + \omega_y g_y + \omega_z g_z)\omega_z}{|\omega|^2}\right]}\Delta\lambda; \quad (15)$$

As similarly discussed above with respect to FIG. 3, $\Delta\omega_z$ may be used to correct subsequent measurements of the Earth's rotation rate about the z-axis. In particular, the estimated bias value ($\Delta\omega_z$) may be subtracted from one or more subsequent measurements of the Earth's rotation rate about the z-axis to produce one or more corrected measurements ($\omega_{z\text{-}corr}$) of the Earth's rotation rate about the z-axis of the survey tool.

Figure 4:
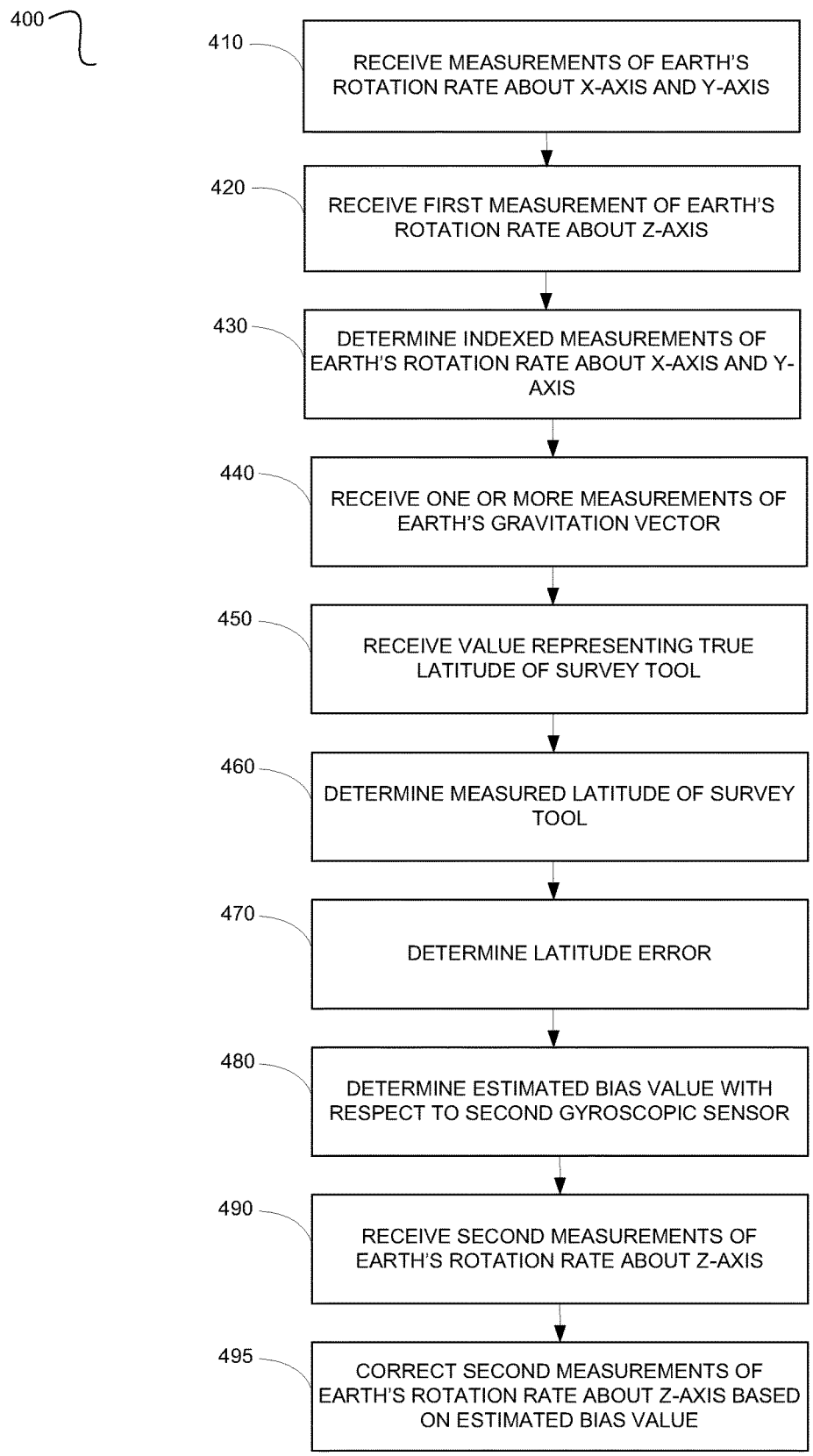
FIG. 4 illustrates a flow diagram of a method for correction of rotation rate measurements based on latitude in accordance with implementations of various techniques described herein.

FIG. 4 illustrates a flow diagram of a method 400 for correction of rotation rate measurements based on latitude in accordance with implementations of various techniques described herein. In one implementation, method 400 may be at least partially performed by a computing system, such as the computing system 130 discussed above. It should be understood that while method 400 indicates a particular order of execution of operations, in some implementations, certain portions of the operations might be executed in a different order. Further, in some implementations, additional operations or steps may be added to the method 400. Likewise, some operations or steps may be omitted.

At block 410, the computing system may receive one or more measurements of the Earth's rotation rate about the x-axis of a survey tool and one or more measurements of the Earth's rotation rate about the y-axis of the survey tool from one or more first gyroscopic sensors of the tool. As noted above, the x-axis and the y-axis may be substantially perpendicular to a longitudinal axis (i.e., z-axis) of the survey tool and may be substantially perpendicular to one another. As also noted above, the one or more first gyroscopic sensors may include a dual-axis gyroscopic sensor, one or more single-axis gyroscopic sensors, or combinations thereof.

In one implementation, the computing system may receive at least two measurements of the Earth's rotation rate about the x-axis that were taken at two or more index positions. As noted above, in one example, the index positions may include a first index position and a second index position that are 180 degrees apart, where a first gyroscopic sensor rotates about the z-axis of the survey tool to turn the first gyroscopic sensor between the two index positions. In another example, the index positions may include a first index position, a second index position, a third index position, and a fourth index position that are 90 degrees apart, where a first gyroscopic sensor rotates about the z-axis of the survey tool to turn the first gyroscopic sensor between the four index positions. As also noted above, a different number of index positions may be used, as well. Similarly, the computing system may receive at least two measurements of the Earth's rotation rate about the y-axis that were taken at two or more index positions.

At block 420, the computing system may receive a first measurement of the Earth's rotation rate about the z-axis of the survey tool from a second gyroscopic sensor. As noted above, the second gyroscopic sensor may be the z-axis gyroscopic sensor discussed above. In particular, the second gyroscopic sensor may be a single-axis gyroscopic sensor or a dual-axis gyroscopic sensor configured to provide measurements of the Earth's rotation rate about the z-axis of the survey tool.

At block 430, the computing system may determine an indexed measurement of the Earth's rotation rate about the x-axis of the survey tool, and may determine an indexed measurement of the Earth's rotation rate about the y-axis of the survey tool. In some implementations, block 430 may be optional. Block 430 may be similar to block 340 of FIG. 3 discussed above.

At block 440, the computing system may receive one or more measurements of the Earth's gravitation vector with respect to the survey tool using one or more accelerometers. In particular, the one or more accelerometers may be configured to provide measurements of a component ($g_x$) of the Earth's gravitation vector with respect to the x-axis of the survey tool, measurements of a component ($g_y$) of the Earth's gravitation vector with respect to the y-axis of the survey tool, and measurements of a component ($g_z$) of the Earth's gravitation vector with respect to the z-axis of the survey tool.

At block 450, the computing system may receive a value representing true latitude of the survey tool. As mentioned above, true latitude may be determined using a device that utilizes a global navigation satellite system, such as global positioning system (GPS).

At block 460, the computing system may determine a measured latitude of the survey tool based on the one or more measurements of the Earth's gravitation vector with respect to the survey tool, the one or more measurements of the Earth's rotation rate about the x-axis of a survey tool, the one or more measurements of the Earth's rotation rate about the y-axis of the survey tool, and the first measurement of the Earth's rotation rate about the z-axis of the survey tool. In particular, the measured latitude may be determined using equations 12 and 13 discussed above.

In a further implementation, the measured latitude may be determined using the indexed measurement of the Earth's rotation rate about the x-axis of the survey tool and the indexed measurement of the Earth's rotation rate about the y-axis, as determined at block 430.

At block 470, the computing system may determine a latitude error by finding a difference between true latitude and the measured latitude of the survey tool.

At block 480, the computing system may determine an estimated bias value ($\Delta\omega_z$) with respect to the second gyroscopic sensor of the survey tool based on the latitude error. In particular, equation 14 discussed above may be used to determine the estimated bias value ($\Delta\omega_z$).

At block 490, the computing system may receive one or more second measurements of the Earth's rotation rate about the z-axis of the survey tool from the second gyroscopic sensor.

At block 495, the computing system may correct the one or more second measurements of the Earth's rotation rate about the z-axis based on the estimated bias value ($\Delta\omega_z$). In particular, similar to block 380 of FIG. 3, the estimated bias value ($\Delta\omega_z$) may be subtracted from the one or more second measurements of the Earth's rotation rate about the z-axis to produce one or more corrected measurements ($\omega_{z\text{-}corr}$) of the Earth's rotation rate about the z-axis of the survey tool.

In a further implementation, the one or more second measurements of the Earth's rotation rate about the z-axis may represent subsequent measurements provided by the second gyroscopic sensor after determining the estimated bias value. The estimated bias value may be stored in memory by the computing system for later use, such that subsequent measurements provided by the second gyroscopic sensor may be corrected.

In another implementation, the methods 300 and/or 400 may be performed during a pre-run calibration procedure, or may be performed periodically when the survey tool is disposed in the wellbore. In particular, the pre-run calibration may be used for instances where the survey tool would be in a deviated and/or substantially horizontal wellbore and oriented in an east/west direction. In yet another implementation, the determination of the estimated bias value using methods 300 and/or 400 may be most accurate in instances where the survey tool would be in a deviated and/or substantially horizontal wellbore and oriented in a north/south direction.

Azimuth Determination

In another implementation, the one or more corrected measurements ($\omega_{z\text{-}corr}$) of the Earth's rotation rate about the z-axis, as determined using method 300 or 400, may be used to determine an azimuth of the survey tool and, hence, an azimuth of the wellbore at the location of the survey tool within the wellbore. The azimuth of the survey tool may be determined using a computing system, such as the computing system 130 discussed above. In a further implementation, the indexed measurements of the Earth's rotation rate about the x-axis and the y-axis of the survey tool may also be used to determine an azimuth of the survey tool and, hence, an azimuth of the wellbore. Such implementations may be used to mitigate the impact of bias values on the accuracy of the sensor's measurements and, thus, the azimuth, particularly for deviated and/or substantially horizontal wellbores.

In such an implementation, the azimuth of the wellbore may be determined using the following equations:

$$\alpha = \arctan\left[\frac{-g_x}{-g_y}\right] \quad (16)$$

$$I = \arctan\left[\frac{\sqrt{g_x^2 + g_y^2}}{g_z}\right] \quad (17)$$

$$\omega_x = \Omega(\cos\phi\cos A\cos I + \sin\phi\sin I)\sin\alpha + \Omega\cos\phi\sin A\cos\alpha \quad (18)$$

$$\omega_y = \Omega(\cos\phi\cos A\cos I + \sin\phi\sin I)\cos\alpha - \Omega\cos\phi\sin A\sin\alpha \quad (19)$$

$$\omega_{z-corr} = \Omega\cos\phi\cos A\sin I - \Omega\sin\phi\cos I \quad (20)$$

$$A = \arctan\left[\frac{\omega_x\cos\alpha - \omega_y\sin\alpha}{(\omega_x\sin\alpha + \omega_y\cos\alpha)\cos I + \omega_{z-corr}\sin I}\right] \quad (21)$$

where a represents toolface angle, I represents the inclination angle, $g_x$, $g_y$, and $g_z$ represent orthogonal components of the Earth's gravitation vector, $\Omega$ represents the Earth's rotation rate, A represents azimuth, $\omega_x$ represents an indexed measurement of the Earth's rotation rate about the x-axis of the survey tool, $\omega_y$ represents an indexed measurement of the Earth's rotation rate about the y-axis of the survey tool, and $\omega_{z-corr}$ represents a corrected measurement of the Earth's rotation rate about the z-axis of the survey tool as determined using methods 300 or 400 discussed above. In some implementations, rather than indexed measurements, $\omega_x$ may represent a single measurement of the Earth's rotation rate about the x-axis of the survey tool and $\omega_y$ may represent a single measurement of the Earth's rotation rate about the y-axis of the survey tool.

Further Estimates of Bias Value

In one implementation, an improved estimate of the bias value with respect to a z-axis gyroscopic sensor of the survey tool may be determined based on both the estimated bias values $\Delta\omega_z$ and $B_z$ (as referenced with respect to FIGS. 3-4 above), where the improved bias value may more accurately reflect the fixed bias in rotation rate measurements provided by the z-axis gyroscopic sensor. The improved estimate of the bias value may be determined using a computing system, such as the computing system 130 discussed above. As shown above with respect to FIGS. 3 and 4, the estimated bias values $\Delta\omega_z$ and $B_z$ represent the same quantity (i.e., an estimated bias value with respect to a z-axis gyroscopic sensor of the survey tool), but are determined using different methodologies. In such an implementation, the improved estimate of the bias value may be a simple average of the estimated bias values $\Delta\omega_z$ and $B_z$, as determined using methods 300 and 400.

In addition, similar to block 380 of FIG. 3 and block 495 of FIG. 4, the improved estimate of the bias value may be subtracted from the one or more second measurements of the Earth's rotation rate about the z-axis to produce one or more corrected measurements ($\omega_{z-corr}$) of the Earth's rotation rate about the z-axis of the survey tool. These one or more corrected measurements ($\omega_{z-corr}$) may then be used to determine an azimuth of the survey tool and, hence, an azimuth of the wellbore at the location of the survey tool within the wellbore, such as by using equation 21.

In another implementation, an improved estimate of the bias value may be determined using one or more statistical estimation processes. For example, in some implementations, measurements of the Earth's rotation rate about a survey tool (e.g., as described in blocks 310-350 of FIG. 3) and/or measured latitudes of the survey tool (e.g., as described in blocks 410-450 of FIG. 4) may be received or determined at a series survey stations in a wellbore. In such implementations, a least squares estimation process may be used to determine the improved estimate of the bias value. In particular, the least squares estimation process may use the measurements of the Earth's rotation rate and/or the measured latitudes for each survey station (as described with respect to FIGS. 3-4) to determine an improved estimate of the bias value. Any least squares estimation process known to those skilled in the art may be used. For example, at least one method for a least squares estimation process is disclosed in Wells D. E., Krakiwsky E. J., "The method of least squares", Department of Geodesy and Geomatics Engineering, University of New Brunswick, Fredericton, N.B., Canada, May 1971.

In addition, similar to block 380 of FIG. 3 and block 495 of FIG. 4, the improved estimate of the bias value may be subtracted from one or more second measurements of the Earth's rotation rate about the z-axis at each survey station, thereby producing one or more corrected measurements ($\omega_{z-corr}$) of the Earth's rotation rate about the z-axis of the survey tool at each survey station. These one or more corrected measurements ($\omega_{z-corr}$) may then be used to determine an azimuth of the survey tool at each survey station and, hence, an azimuth of the wellbore at the location of the survey tool at each survey station within the wellbore, such as by using equation 21.

In another example, iterative estimation processes, such as Kalman filtering, may be used to determine the improved estimate of the bias value. In such processes, sequential measurements of the Earth's rotation rate about a survey tool (e.g., as described in blocks 310-350 of FIG. 3) and/or sequential measured latitudes of the survey tool (e.g., as described in blocks 410-450 of FIG. 4) may be received or determined, and then may be used to determine an improved estimate of the bias value. Using the iterative estimation processes, subsequent measurements of the Earth's rotation rate about a survey tool and/or sequential measured latitudes of the survey tool may be used to update the improved estimate of the bias value. Any iterative estimation process known to those skilled in the art may be used. For example, at least one method for an iterative estimation process is disclosed in: Gelb, A. (Ed), *Applied Optimal Estimation*, Massachusetts Institute of Technology, Cambridge, Mass., 1974; and also in Jazwinski, A. H., "Stochastic processes and filtering theory", Academic Press, 1970.

In addition, similar to block 380 of FIG. 3 and block 495 of FIG. 4, the improved estimate of the bias value may be subtracted from the one or more second measurements of the Earth's rotation rate about the z-axis to produce one or more corrected measurements ($\omega_{z-corr}$) of the Earth's rotation rate about the z-axis of the survey tool. These one or more corrected measurements ($\omega_{z-corr}$) may then be used to determine an azimuth of the survey tool and, hence, an azimuth of the wellbore at the location of the survey tool within the wellbore, such as by using equation 21. Further, these one or more corrected measurements ($\omega_{z-corr}$) may also be updated in real-time, as the improved estimate of the bias value may change based on subsequent measurements of the Earth's rotation rate and/or sequential measured latitudes. As such, the azimuth determinations may also change in real-time based on subsequent measurements of the Earth's rotation rate and/or sequential measured latitudes.

In yet another implementation, the estimated bias values $\Delta\omega_z$ and/or $B_z$ (as referenced with respect to FIGS. 3-4 above) may vary at different temperatures. As such, a temperature profile may be created which match the estimated bias values $\Delta\omega_z$ and/or $B_z$ with a corresponding temperature. In one implementation, the temperatures may be measured using the one or more temperature sensors mentioned above. The estimated bias values $\Delta\omega_z$ and/or $B_z$ for use in correcting the one or more second measurements of the Earth's rotation rate about the z-axis may be determined based on the real time temperature and the temperature profile.

In sum, implementations relating to correction of rotation rate measurements may be used to compensate for bias values in the measurements provided by the z-axis gyroscopic sensor. Without the implementations described above, bias values may severely impact the accuracy of the z-axis gyroscopic sensor's measurements and, thus, the azimuth, particularly for deviated and/or substantially horizontal wellbores.

As such, using the implementations described above, the bias values may be used to correct rotation rate measurements from a survey tool, which may then be used to more accurately determine an azimuth of the survey tool, and, hence, an azimuth of the wellbore at the location of the survey tool within the wellbore. This azimuth of the wellbore may then be used to determine the extent to which the wellbore deviates from a particular trajectory. One or more drilling operations may be used based on this determined deviation, including a change in the steering of drilling equipment within the wellbore.

Computing System

Various implementations of computing systems are further discussed below, including computing system 130 of FIG. 1. Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, smart watches, personal wearable computing systems networked with other computing systems, tablet computers, and distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hard-wired links, wireless links, or combinations thereof. The distributed computing environments may span multiple continents and multiple vessels, ships or boats. In a distributed computing environment, program modules may be located in both local and remote computer storage media including memory storage devices.

Figure 5:
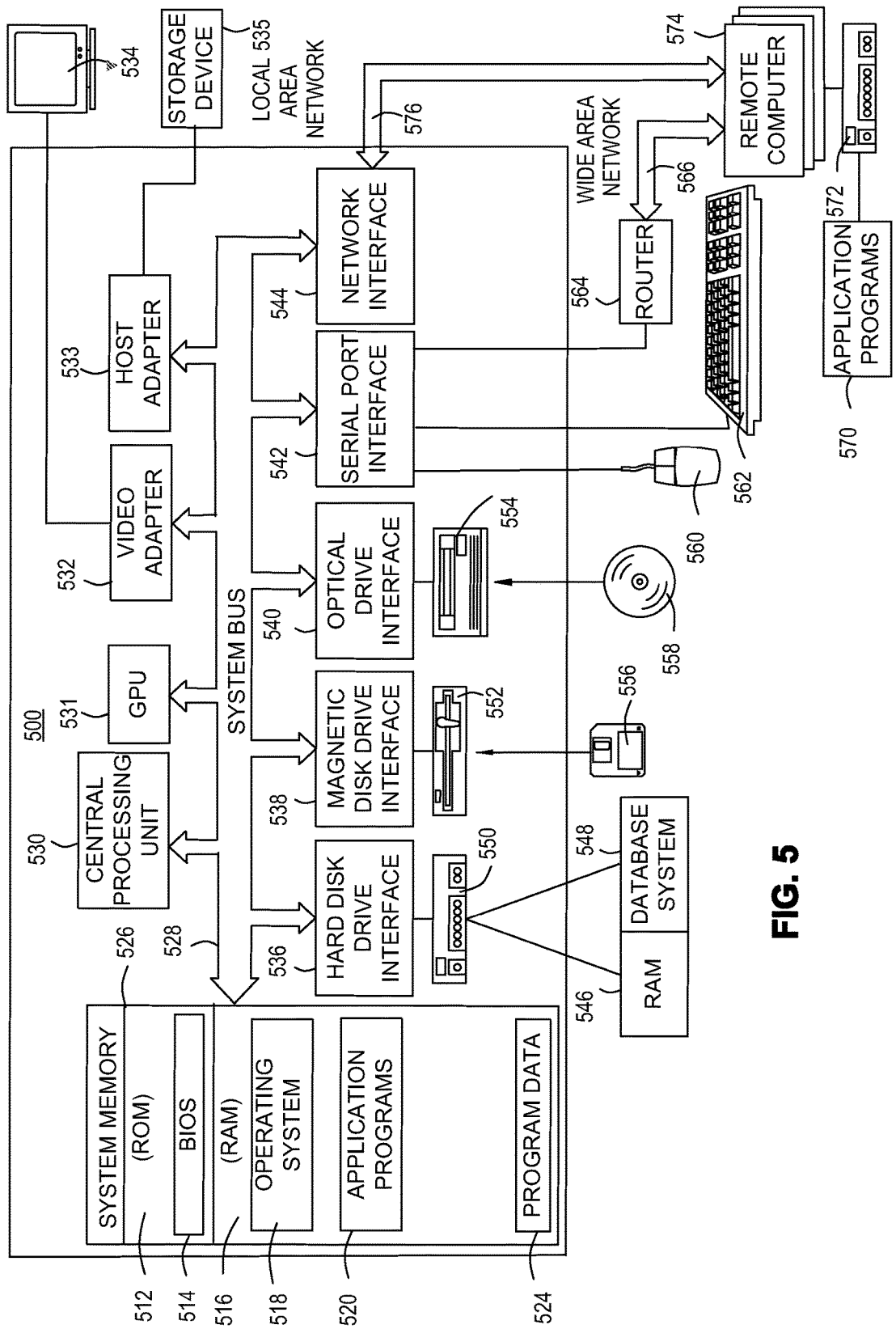
FIG. 5 illustrates a schematic diagram of a computing system in which the various technologies described herein may be incorporated and practiced.

FIG. 5 illustrates a schematic diagram of a computing system 500 in which the various technologies described herein may be incorporated and practiced. Although the computing system 500 may be a conventional desktop or a server computer, as described above, other computer system configurations may be used.

The computing system 500 may include a central processing unit (CPU) 530, a system memory 526, a graphics processing unit (GPU) 531 and a system bus 528 that couples various system components including the system memory 526 to the CPU 530. Although one CPU is illustrated in FIG. 5, it should be understood that in some implementations the computing system 500 may include more than one CPU. The GPU 531 may be a microprocessor specifically designed to manipulate and implement computer graphics. The CPU 530 may offload work to the GPU 531. The GPU 531 may have its own graphics memory, and/or may have access to a portion of the system memory 526. As with the CPU 530, the GPU 531 may include one or more processing units, and the processing units may include one or more cores. The system bus 528 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 526 may include a read-only memory (ROM) 512 and a random access memory (RAM) 546. A basic input/output system (BIOS) 514, containing the basic routines that help transfer information between elements within the computing system 500, such as during start-up, may be stored in the ROM 512.

The computing system 500 may further include a hard disk drive 550 for reading from and writing to a hard disk, a magnetic disk drive 552 for reading from and writing to a removable magnetic disk 556, and an optical disk drive 554 for reading from and writing to a removable optical disk 558, such as a CD ROM or other optical media. The hard disk drive 550, the magnetic disk drive 552, and the optical disk drive 554 may be connected to the system bus 528 by a hard disk drive interface 556, a magnetic disk drive interface 558, and an optical drive interface 550, respectively. The drives and their associated computer-readable media may provide nonvolatile storage of computer-readable instructions, data structures, program modules and other data for the computing system 500.

Although the computing system 500 is described herein as having a hard disk, a removable magnetic disk 556 and a removable optical disk 558, it should be appreciated by those skilled in the art that the computing system 500 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 500. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 500 may also include a host adapter 533 that connects to a storage device 535 via a small computer system interface (SCSI) bus, a Fiber Channel bus, an eSATA bus, or using any other applicable computer bus interface. Combinations of any of the above may also be included within the scope of computer readable media.

A number of program modules may be stored on the hard disk 550, magnetic disk 556, optical disk 558, ROM 512 or RAM 516, including an operating system 518, one or more application programs 520, program data 524, and a database system 548. The application programs 520 may include various mobile applications ("apps") and other applications configured to perform various methods and techniques described herein. The operating system 518 may be any suitable operating system that may control the operation of a networked personal or server computer, such as Windows® XP, Mac OS® X, Unix-variants (e.g., Linux® and BSD®), and the like.

A user may enter commands and information into the computing system 500 through input devices such as a keyboard 562 and pointing device 560. Other input devices may include a microphone, joystick, game pad, satellite dish, scanner, or the like. These and other input devices may be connected to the CPU 530 through a serial port interface 542 coupled to system bus 528, but may be connected by other interfaces, such as a parallel port, game port or a universal serial bus (USB). A monitor 534 or other type of display device may also be connected to system bus 528 via an interface, such as a video adapter 532. In addition to the monitor 534, the computing system 500 may further include other peripheral output devices such as speakers and printers.

Further, the computing system 500 may operate in a networked environment using logical connections to one or more remote computers 574. The logical connections may be any connection that is commonplace in offices, enterprise-wide computer networks, intranets, and the Internet, such as local area network (LAN) 556 and a wide area network (WAN) 566. The remote computers 574 may be another a computer, a server computer, a router, a network PC, a peer device or other common network node, and may include many of the elements describes above relative to the computing system 500. The remote computers 574 may also each include application programs 570 similar to that of the computer action function.

When using a LAN networking environment, the computing system 500 may be connected to the local network 576 through a network interface or adapter 544. When used in a WAN networking environment, the computing system 500 may include a router 564, wireless router or other means for establishing communication over a wide area network 566, such as the Internet. The router 564, which may be internal or external, may be connected to the system bus 528 via the serial port interface 552. In a networked environment, program modules depicted relative to the computing system 500, or portions thereof, may be stored in a remote memory storage device 572. It will be appreciated that the network connections shown are merely examples and other means of establishing a communications link between the computers may be used.

The network interface 544 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 574.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Also, the program code may execute entirely on a user's computing device, on the user's computing device, as a stand-alone software package, on the user's computer and on a remote computer or entirely on the remote computer or a server computer.

The system computer 500 may be located at a data center remote from the survey region. The system computer 500 may be in communication with the receivers (either directly or via a recording unit, not shown), to receive signals indicative of the reflected seismic energy. These signals, after conventional formatting and other initial processing, may be stored by the system computer 500 as digital data in the disk storage for subsequent retrieval and processing in the manner described above. In one implementation, these signals and data may be sent to the system computer 500 directly from sensors, such as geophones, hydrophones and the like. When receiving data directly from the sensors, the system computer 500 may be described as part of an in-field data processing system. In another implementation, the system computer 500 may process seismic data already stored in the disk storage. When processing data stored in the disk storage, the system computer 500 may be described as part of a remote data processing center, separate from data acquisition. The system computer 500 may be configured to process data as part of the in-field data processing system, the remote data processing system or a combination thereof.

Those with skill in the art will appreciate that any of the listed architectures, features or standards discussed above with respect to the example computing system 500 may be omitted for use with a computing system used in accordance with the various embodiments disclosed herein because technology and standards continue to evolve over time.

While the foregoing is directed to implementations of various technologies described herein, other and further implementations may be devised without departing from the basic scope thereof. Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

What is claimed is:

1. A method, comprising:
    determining an estimated rotation rate measurement about a z-axis of a survey tool disposed in a wellbore using one or more rotation rate measurements about a x-axis of the survey tool and one or more rotation rate measurements about a y-axis of the survey tool;
    determining a bias value based on a difference between a first rotation rate measurement about a z-axis of the survey tool and the estimated rotation rate measurement;
    correcting one or more second rotation rate measurements about the z-axis of the survey tool based on the determined bias value; and
    determining one or more drilling operations based at least in part on the corrected one or more second rotation rate measurements.

2. The method of claim 1, wherein the one or more rotation rate measurements about the x-axis of the survey tool and the one or more rotation rate measurements about the y-axis of the survey tool are not indexed measurements.

3. The method of claim 1, wherein determining the estimated rotation rate measurement about the z-axis of the survey tool comprises determining the estimated rotation rate measurement about the z-axis using the Earth's rotation rate, the one or more rotation rate measurements about the x-axis of the survey tool, and the one or more rotation rate measurements about the y-axis of the survey tool.

4. The method of claim 1, wherein correcting the one or more second rotation rate measurements about the z-axis of the survey tool comprises subtracting the determined bias value from the one or more second rotation rate measurements about the z-axis of the survey tool.

5. The method of claim 1, wherein determining the estimated rotation rate measurement about the z-axis of the survey tool comprises determining the estimated rotation rate measurement about the z-axis based on a true latitude of the survey tool, one or more measurements of the Earth's gravitation vector, the one or more rotation rate measurements about the x-axis of the survey tool, and the one or more rotation rate measurements about the y-axis of the survey tool.

6. The method of claim 1, wherein the x-axis and the y-axis are substantially perpendicular to each other, wherein the x-axis and the y-axis are substantially perpendicular to the z-axis, and wherein the z-axis is substantially parallel to a longitudinal axis of the wellbore.

7. The method of claim 1, wherein the one or more rotation rate measurements about the x-axis of the survey tool, the one or more rotation rate measurements about the y-axis of the survey tool, the first rotation rate measurement about the z-axis of the survey tool, and the one or more second rotation rate measurements about the z-axis of the survey tool are obtained using one or more dual-axis gyroscopic sensors, one or more single-axis gyroscopic sensors, or combinations thereof.

8. The method of claim 7, wherein the one or more dual-axis gyroscopic sensors and the one or more single-axis gyroscopic sensors comprise one or more Coriolis vibratory gyroscopic sensors, one or more spinning mass gyroscopic sensors, one or more optical gyroscopic sensors, one or more microelectromechanical system (MEMS) gyroscopic sensors, or combinations thereof.

9. A system, comprising:
    a survey tool disposed in a wellbore, comprising:
        one or more first gyroscopic sensors configured to provide one or more rotation rate measurements about a first axis of the survey tool, and to provide one or more rotation rate measurements about a second axis of the survey tool; and
        a second gyroscopic sensor configured to provide a first rotation rate measurement about a third axis of the survey tool, and to provide one or more second rotation rate measurements about the third axis of the survey tool; and
    a computing system, comprising:
        a processor; and
        a memory comprising a plurality of program instructions which, when executed by the processor, cause the processor to:
            determine an estimated rotation rate measurement about the third axis of the survey tool based on the one or more rotation rate measurements about the first axis of the survey tool and the one or more rotation rate measurements about the second axis of the survey tool;
            determine a bias value based on a difference between the first rotation rate measurement about the third axis of the survey tool and the estimated rotation rate measurement;
            correct the one or more second rotation rate measurements about the third axis of the survey tool based on the determined bias value; and
            determine one or more drilling operations based at least in part on the corrected one or more second rotation rate measurements.

10. The system of claim 9, wherein the program instructions which, when executed by the processor, cause the processor to determine the estimated rotation rate measurement about the third axis of the survey tool further comprise program instructions which, when executed by the processor, cause the processor to:
    determine the estimated rotation rate measurement about the third axis using the Earth's rotation rate, the one or more rotation rate measurements about the first axis of the survey tool, and the one or more rotation rate measurements about the second axis of the survey tool, wherein the one or more rotation rate measurements about the first axis of the survey tool and the one or more rotation rate measurements about the second axis of the survey tool are not indexed measurements.

11. The system of claim 9, wherein the program instructions which, when executed by the processor, cause the processor to determine the estimated rotation rate measurement about the third axis of the survey tool further comprise program instructions which, when executed by the processor, cause the processor to:
  determine an indexed rotation rate measurement about the first axis of the survey tool based on the one or more rotation rate measurements about the first axis of the survey tool;
  determine an indexed rotation rate measurement about the second axis of the survey tool based on the one or more rotation rate measurements about the second axis of the survey tool; and
  determine the estimated rotation rate measurement about the third axis using the Earth's rotation rate, the indexed rotation rate measurement about the first axis of the survey tool, and the indexed rotation rate measurement about the second axis of the survey tool.

12. The system of claim 9, wherein the program instructions which, when executed by the processor, cause the processor to correct the one or more second rotation rate measurements about the third axis of the survey tool further comprise program instructions which, when executed by the processor, cause the processor to subtract the determined bias value from the one or more second rotation rate measurements about the third axis of the survey tool.

13. The system of claim 9, wherein the computing system is disposed within the wellbore or disposed at a surface location.

14. A method, comprising:
  determining a measured latitude of a survey tool disposed in a wellbore based on one or more measurements of the Earth's gravitation vector, one or more rotation rate measurements about a x-axis of the survey tool, one or more rotation rate measurements about a y-axis of the survey tool, and a first rotation rate measurement about a z-axis of the survey tool;
  determining a first bias value based on a true latitude of the survey tool and the measured latitude of the survey tool;
  correcting one or more second rotation rate measurements about the z-axis of the survey tool based on the first bias value; and
  determining one or more drilling operations based at least in part on the corrected one or more second rotation rate measurements.

15. The method of claim 14, wherein determining the first bias value comprises:
  determining a latitude error based on a difference between the true latitude and the measured latitude of the survey tool; and
  determining the first bias value based on the latitude error.

16. The method of claim 14, wherein correcting the one or more second rotation rate measurements about the z-axis of the survey tool comprises subtracting the first bias value from the one or more second rotation rate measurements about the z-axis of the survey tool.

17. The method of claim 14, further comprising determining an azimuth of the survey tool based on the corrected one or more second rotation rate measurements.

18. The method of claim 14, further comprising:
  determining an estimated rotation rate measurement about the z-axis of the survey tool based on the one or more rotation rate measurements about the x-axis of the survey tool and the one or more rotation rate measurements about the y-axis of the survey tool; and
  determining a second bias value based on a difference between the first rotation rate measurement about the z-axis of the survey tool and the estimated rotation rate measurement;
  determining a third bias value based on the first bias value and the second bias value; and
  correcting the one or more second rotation rate measurements about the z-axis of the survey tool based on the third bias value.

19. The method of claim 18, wherein determining the third bias value comprises:
  determining the third bias value based on an average of the first bias value and the second bias value;
  determining the third bias value based on a Kalman filtering technique performed on the measured latitude, the one or more rotation rate measurements about the x-axis of the survey tool, the one or more rotation rate measurements about the y-axis of the survey tool, the first rotation rate measurement about the z-axis of the survey tool, or combinations thereof;
  determining the third bias value based on a least squares estimation process performed on the measured latitude, the one or more rotation rate measurements about the x-axis of the survey tool, the one or more rotation rate measurements about the y-axis of the survey tool, the first rotation rate measurement about the z-axis of the survey tool, or combinations thereof; or
  combinations thereof.

20. The method of claim 18, further comprising determining an azimuth of the survey tool based on the one or more second rotation rate measurements about the z-axis of the survey tool corrected based on the third bias value.

* * * * *